(12) United States Patent
Shashanka et al.

(10) Patent No.: US 12,050,682 B2
(45) Date of Patent: *Jul. 30, 2024

(54) METHOD AND ELECTRONIC DEVICE FOR GENERATING SEMANTIC REPRESENTATION OF DOCUMENT TO DETERMINE DATA SECURITY RISK

(71) Applicant: CONCENTRIC SOFTWARE, INC., Saratoga, CA (US)

(72) Inventors: Madhusudana Shashanka, Austin, TX (US); Bonnie Arogyam Varghese, Milpitas, CA (US); Shankar Subramaniam, Cupertino, CA (US); Karthik Krishnan, San Jose, CA (US); Rency Joseph, Santa Clara, CA (US)

(73) Assignee: CONCENTRIC SOFTWARE, INC., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,239

(22) Filed: May 7, 2023

(65) Prior Publication Data

US 2023/0273992 A1  Aug. 31, 2023

Related U.S. Application Data

(63) Continuation of application No. 17/160,369, filed on Jan. 27, 2021, now Pat. No. 11,687,647.

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ............ G06F 21/552; G06F 2221/034; G06F 2221/2113; G06F 21/6218; G06F 40/279; G06F 40/30

See application file for complete search history.

(56) References Cited

U.S. PATENT DOCUMENTS

| 7,546,334 | B2* | 6/2009 | Redlich | G06F 21/6263 709/219 |
| 10,885,276 | B2* | 1/2021 | Kartoun | H04L 63/123 |

(Continued)

*Primary Examiner* — Christopher A Revak
(74) *Attorney, Agent, or Firm* — Evergreen Valley Law Group; Kanika Radhakrishnan (57) ABSTRACT

A method and an electronic device (100) are disclosed for generating semantic representation of a document to determine data security risk associated with the document. The method includes receiving, by a document semantics controller (160) of the electronic device (100), a document in an electronic form and determining, by the document semantics controller (160), raw text. Further, the method includes generating, by the document semantics controller (160), a plurality of sentence blocks using the raw text and determining, by the document semantics controller (160), embeddings for the plurality of sentence blocks. Further, the method includes determining, by the document semantics controller (160), the semantic representation of the document based on the embeddings for each of the sentence blocks; and generating, by the document semantics controller (160), the semantic representation of the document to determine the data security risk associated with the document.

18 Claims, 6 Drawing Sheets

(56) References Cited

U.S. PATENT DOCUMENTS

| | | | |
|---|---|---|---|
| 11,687,647 B2* | 6/2023 | Shashanka | G06F 21/6218 |
| | | | 726/25 |
| 11,816,422 B1* | 11/2023 | Tanski | G06F 40/40 |
| 2007/0220268 A1* | 9/2007 | Krishnaprasad | G06F 16/2455 |
| | | | 713/182 |
| 2013/0097706 A1* | 4/2013 | Titonis | G06F 21/566 |
| | | | 726/22 |
| 2016/0210468 A1* | 7/2016 | Turner | G06F 21/6218 |
| 2018/0288070 A1* | 10/2018 | Price | G06F 8/31 |
| 2019/0156256 A1* | 5/2019 | Argyros | G06F 40/216 |
| 2020/0233958 A1* | 7/2020 | Yao | G06F 21/554 |

\* cited by examiner

METHOD AND ELECTRONIC DEVICE FOR GENERATING SEMANTIC REPRESENTATION OF DOCUMENT TO DETERMINE DATA SECURITY RISK

The present application claims the benefit of provisional application No. 62/966,663 filed 2020, Jan. 28 and is a continuation of the non-provisional application Ser. No. 17/160,369 filed 2021, Jan. 27.

TECHNICAL FIELD

The embodiments herein generally relates to data security. More particularly related to a method and electronic device for generating semantic representation of document to determine data security risk associated with the document, which includes extracting text from the document and transforming the text into a mathematical representation that encodes a semantic meaning of the document. The semantic representation of the document is used to determine the data security risk of the document by comparing the document with semantic neighboring documents and their security configurations.

BACKGROUND

Generally, organizations generate huge volumes of unstructured data in the form of files, reports, documents etc. The organizations adopt various security measures to protect data from external threats. However, focus on data security within the organization remains largely on a back-foot with sensitive data which needs to be protected from unauthorized access and data exfiltration. The sensitive data can be, for example, a document including personal information of customers such as biometrics, address, contact details, etc. Other examples of the sensitive data include business sensitive reports, product roadmaps, merger discussions etc. Setting up appropriate access policies hinges on the ability of the organization to identify which documents are indeed sensitive. This is a hard problem for which there are no good tools in the market.

Existing tools largely ignore content of documents and rely on metadata information such as document creator, document users and departments associated with the user, etc. when the information is available. To the extent tools analyze the content of documents they often utilize traditional natural language processing approaches using word-counts and topic models. However, words may not be the atomic units of meaning, but sentences are. In an example, consider synonymys which may be used by different users to convey the same meaning. Consider a first sentence "how old are you?" and a second sentence "what is your age?". Though the first sentence and the second sentence do not have any words in common, the first sentence and the second sentence are identical in meaning. In an example, consider polysemy, where the same word can mean very different things based on surrounding context. To illustrate the polysemy usage further, consider a third sentence "I arrived at the bank after crossing the street" and a fourth sentence "I arrived at the bank after crossing the river". Thought the third sentence and the fourth sentence have identical words except for the last, the meanings are different.

Thus, it is desired to address the above mentioned disadvantages or other shortcomings or at least provide a useful alternative.

SUMMARY

The present disclosure provides a method and an electronic device for generating semantic representation of a document using an electronic device to determine data security risk associated with the document. The method includes receiving, by a document semantics controller of the electronic device, a document in an electronic form and determining, by the document semantics controller, raw text. Further, the method includes generating, by the document semantics controller, a plurality of sentence blocks using the raw text and determining, by the document semantics controller, embeddings for the plurality of sentence blocks. Further, the method includes determining, by the document semantics controller, the semantic representation of the document based on the embeddings for each of the sentence blocks and generating, by the document semantics controller, the semantic representation of the document to determine the data security risk associated with the document.

In an embodiment, the method further includes receiving, by the document semantics controller of the electronic device, at least one request from at least one user to access the document in the electronic form and determining, by the document semantics controller of the electronic device, at least one attribute of a plurality of attributes associated with the user, wherein the at least one attribute indicates a user security risk profile. Further, the method includes determining, by the document semantics controller of the electronic device, a document security risk profile based on the semantic representation of the document and semantic representation of neighboring documents and determining, by the document semantics controller of the electronic device, whether the user security risk profile matches the document security risk profile. Further, performing, by the document semantics controller of the electronic device allow the user to access the document, in response to determining that the user security risk profile matches the document security risk profile, and deny the user access to the document, in response to determining that the user security risk profile does not match the document security risk profile.

In an embodiment, determining, by the document semantics controller of the electronic device, the raw text from the plurality of content includes extracting, by the document semantics controller of the electronic device, the raw text from the plurality of content and performing, by the document semantics controller of the electronic device, a character filtration on the raw text to eliminate predefined types of characters from the raw text. Further, the method includes determining, by the document semantics controller of the electronic device, at least one word and at least one sentence in the raw text extracted from the document which is not corresponding to the semantic representation of the document and eliminating, by the document semantics controller of the electronic device, at least one word and at least one sentence not corresponding to the semantic representation of the document; and determining, by the document semantics controller of the electronic device, the raw text from the plurality of content.

In an embodiment, generating, by the document semantics controller of the electronic device, the plurality of sentences blocks using the raw text includes determining, by the document semantics controller of the electronic device, that a number of extracted raw text meets a predefined threshold for the raw text and generating, by the document semantics controller of the electronic device, a plurality of tokens by combining a set of the raw text extracted from the document. Further, the method includes generating, by the document semantics controller of the electronic device, the plurality of sentence blocks based on sentence splicing of the plurality of tokens, wherein each sentence block of the plurality of sentence blocks comprises a predefined number of tokens.

In an embodiment, at least one embedding for each of the plurality of sentence blocks is determined using a deep-learning language model.

In an embodiment, determining, by the document semantics controller of the electronic device, the semantic representation of the document based on at least one embedding for each of the plurality of sentence blocks includes determining, by the document semantics controller of the electronic device, an embedding matrix comprising at least one embedding for each of the plurality of sentence blocks and determining, by the document semantics controller of the electronic device, a document embedding by aggregating at least one embedding for each of the plurality of sentence blocks in the embedding matrix; and determining, by the document semantics controller of the electronic device, the semantic representation of the document based on the document embedding.

In an embodiment, determining, by the document semantics controller of the electronic device, the semantic representation of the document based on the at least one embeddings for each of the plurality of sentence blocks includes generating, by the document semantics controller of the electronic device, a similarity graph using the plurality of sentence blocks and determining, by the document semantics controller of the electronic device, a page-rank score for the each of the sentence blocks of the plurality of sentence blocks and performing, by the document semantics controller of the electronic device, a maximum margin relevance scoring on the page-rank score determined for each of the sentence blocks. Further, the method includes determining, by the document semantics controller of the electronic device, a set of sentence blocks with highest maximum margin relevance scoring and determining, by the document semantics controller of the electronic device, a document embedding by aggregating the set of sentence blocks with the highest maximum margin relevance scoring and determining, by the document semantics controller of the electronic device, the semantic representation of the document based on the document embedding In an embodiment, determining, by the document semantics controller of the electronic device, the semantic representation of the document based on the at least one embeddings for each of the plurality of sentence blocks includes identifying, by the document semantics controller of the electronic device, embeddings of a set of sentence blocks of the plurality of sentence blocks that are outlying and filtering, by the document semantics controller of the electronic device, to exclude the set of sentence blocks that are outlying. Further, the method includes determining, by the document semantics controller of the electronic device, a document embedding by aggregating the embeddings of remaining sentence blocks after filtering the set of sentence blocks that are outlying; and determining, by the document semantics controller of the electronic device, the semantic representation of the document based on the document embedding.

In an embodiment, determining, by the document semantics controller of the electronic device, the semantic representation of the document based on the at least one embeddings for each of the plurality of sentence blocks includes determining, by the document semantics controller of the electronic device, a plurality of clusters comprising each of the embeddings of each of the plurality of sentence blocks and determining, by the document semantics controller of the electronic device, at least one cluster of the plurality of clusters that is semantic noise. Further, the method includes filtering, by the document semantics controller of the electronic device, the at least one cluster of the plurality of clusters that is the semantic noise and determining, by the document semantics controller of the electronic device, a document embedding by aggregating the embeddings of remaining sentence blocks after filtering the semantic noise; and determining, by the document semantics controller of the electronic device, the semantic representation of the document based on the document embedding.

Accordingly the embodiments herein provide an electronic device (100) for generating semantic representation of a document to determine data security risk associated with the document. The electronic device includes a memory; a processor and a document semantics controller. The document semantics controller is configured to receive a document in an electronic form, wherein the document comprises a plurality of content and determine raw text from the plurality of content. Further, the document semantics controller is configured to generate a plurality of sentence blocks of a predefined size using the raw text and determine at least one embeddings for each of the plurality of sentence blocks. Furthermore, the document semantics controller is configured to determine the semantic representation of the document based on the at least one embeddings for each of the plurality of sentence blocks and generate the semantic representation of the document to determine the data security risk associated with the document.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

DETAILED DESCRIPTION OF EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Prior to describing the present embodiment detail, it is useful to provide definitions for key terms and concepts used herein. Unless defined otherwise, all technical and scientific terms used herein have the same meaning as commonly understood by one of ordinary skill in the art.

The present disclosure provides a method and an electronic device for generating semantic representation of a document using an electronic device to determine data security risk associated with the document. The method includes receiving, by a document semantics controller of the electronic device, a document in an electronic form and determining, by the document semantics controller, raw text. Further, the method includes generating, by the document semantics controller, a plurality of sentence blocks using the raw text and determining, by the document semantics controller, embeddings for the plurality of sentence blocks. Further, the method includes determining, by the document semantics controller, the semantic representation of the document based on the embeddings for each of the sentence blocks and generating, by the document semantics controller, the semantic representation of the document to determine the data security risk associated with the document.

Referring now to the drawings, and more particularly to FIGS. 1 through 3D, where similar reference characters denote corresponding features consistently throughout the figures, there are shown preferred embodiments.

Figure 1:
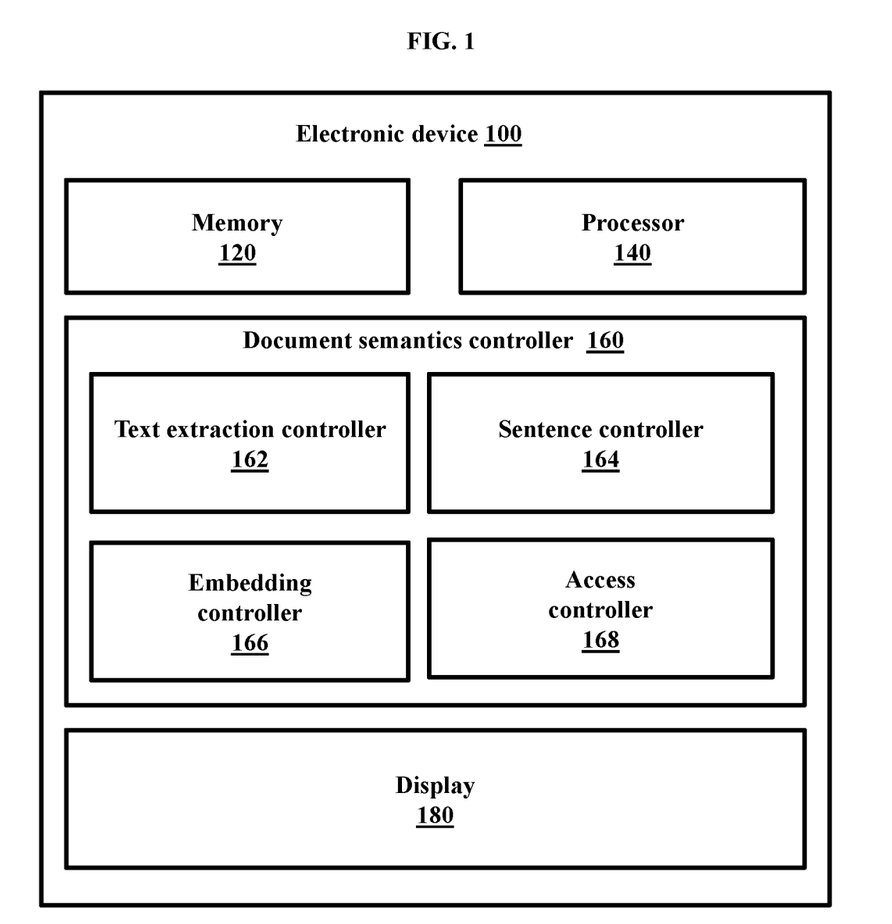
FIG. 1 is a block diagram illustrating an electronic device for generating semantic representation of a document to determine data security risk associated with the document, according to the embodiments as disclosed herein.

FIG. 1 is a block diagram illustrating an electronic device (100) for generating semantic representation of a document to determine data security risk associated with the document, according to the embodiments as disclosed herein.

Referring to the FIG. 1, the electronic device (100) is one of but not limited to, for example, a mobile electronic device, a smart electronic device, Personal Digital Assistant (PDA), a tablet, a wearable device, an Internet of Things (IoT) device, a virtual reality device, a foldable device, a flexible device, a display device and an immersive system. or the like. In another embodiment, the proposed method may be applicable to the documents/files that are served in a common location such as a common-server, cloud server, etc. The electronic device (100) includes a memory (120), a processor (140) and a document semantics controller (160) and a display (180).

In an embodiment, the memory (120) stores instructions to be executed by the processor (120). The memory (120) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In certain examples, a non-transitory storage medium may store data that can, over time, change (e.g., in Random Access Memory (RAM) or cache).

The processor (140) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (140) may include multiple cores and is configured to execute the instructions stored in the memory (120).

The document semantics controller (160) includes a text extraction controller (162), a sentence controller (164), an embedding controller (166) and a security controller (168). In an embodiment, the text controller (162) is configured to receive a document which includes a plurality of content, in an electronic form. The plurality of content may include but not limited to, text, images, audio, video, animations and the like. Further, the text controller (162) is configured to extract raw text from the plurality of content in the document and perform a character filtration on the raw text to eliminate predefined types of characters from the raw text. The raw text includes only characters of readable material without any graphical representation and objects. The raw text may include arrangement of text, spaces, line breaks, tabulation characters, etc. The predefined types of characters includes but not limited to special non-ascii characters, redundant whitespaces, certain punctuation characters such as quotes, brackets, etc. Further, the text controller (162) is configured to determine and eliminate word (s) and sentence (s) in the raw text extracted which are not corresponding to the semantic representation of the document, to obtain the final raw text from the plurality of content. For example, if the semantic representation of the document pertains to finance then the words such as "biological solution", "reverberatory furnace", "livestock rearing", etc. which do not correspond to the finance may be determined and eliminated from the raw text. The text controller (162) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the sentence controller (164) is configured to receive the raw text extracted by the text extraction controller (162) and determine that a number of extracted raw text meets a predefined threshold for the raw text. The predefined threshold for the raw text may be defined for example dynamically based on learning or may be manually defined. Further, the sentence controller (164) is configured to generate a plurality of tokens by combining a set of the raw text extracted from the document and generate the plurality of sentence blocks based on sentence splicing of the plurality of tokens. Each sentence block includes a predefined number of tokens such as for example a sentence block of only 128 tokens. The sentence controller (164) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the embedding controller (166) is configured to determine embeddings for each sentence block of the plurality sentence blocks. In machine learning, the embedding is a relatively low-dimensional space into which a high dimensional vector is translated. The embedding captures some of the semantics of the sentence block by placing semantically similar sentence blocks close together in the embedding space. Further, the embedding controller (166) is configured to determine a document embedding which is obtained using the embeddings for each sentence block of the plurality of sentence blocks. The document embedding determines the semantic representation of the document which is used to manage access to the document. The document embedding represents a class of the document in the electronic form. For example, in an organization the classes may include documents related to finance, documents related to management, documents related to technology, documents related to legal domain, etc. The document embedding may be obtained by various techniques to determine the semantic representation of the document such as for example, aggregating the embeddings of all the sentence blocks; a representative sentences technique; an outlier sentences exclusion technique and a semantic noise filtering technique.

In the aggregating the embeddings of all the sentence blocks technique, the embedding controller (166) is configured to determine an embedding matrix comprising at least one embedding for each of the plurality of sentence blocks and determine a document embedding by aggregating the at least one embeddings for each of the plurality of sentence blocks in the embedding matrix and determine the semantic representation of the document based on the document embedding.

In the representative sentences technique, the embedding controller (166) is configured to generate a similarity graph using the plurality of sentence blocks and determine a page-rank score for the each of the sentence blocks of the plurality of sentence blocks. Further, the embedding controller (166) is configured to perform a maximum margin relevance scoring on the page-rank score determined for each of the sentence blocks and determine a set of sentence blocks with highest maximum margin relevance scoring. Furthermore, the embedding controller (166) is configured to determine a document embedding by aggregating the set of sentence blocks with the highest maximum margin relevance scoring and determine the semantic representation of the document based on the document embedding.

In the outlier sentences exclusion technique, the embedding controller (166) is configured to identify embeddings of a set of sentence blocks of the plurality of sentence blocks that are outlying and filter to exclude the set of sentence blocks that are outlying. Detection of outlying embeddings from a collection of embeddings can be accomplished by anomaly detection algorithms. For example, we utilize the Robust Principal Components Analysis algorithm which analyzes the matrix of all embeddings and determines anomaly scores associated with each. Embeddings with the highest scores are the most outlying ones in the embedding space. Further, the embedding controller (166) is configured to determine a document embedding by aggregating the embeddings of remaining sentence blocks after filtering the set of sentence blocks that are outlying and determine the semantic representation of the document based on the document embedding.

In the semantic noise filtering technique, the embedding controller (166) is configured to determine a plurality of clusters comprising each of the embeddings of each of the plurality of sentence blocks and determine at least one cluster of the plurality of clusters that is a semantic noise. This can be accomplished by a model which has been trained in an earlier phase. For example, we cluster sentence embeddings across all different files and cluster the embeddings into groups based on semantic similarity. We manually review the sentences present in each cluster and tag every cluster as semantic noise if it corresponds to sentences deemed by human expert as not adding semantic value. Examples of such sentences include "this page is intentionally left blank" and "this document is a draft." Further, the embedding controller (166) is configured to filter the at least one cluster of the plurality of clusters that is the semantic noise and determine a document embedding by aggregating the embeddings of remaining sentence blocks after filtering the semantic noise.

The embedding controller (166) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In another embodiment, the semantic noise filtering may be used as a preprocessing step before determining the document embedding and then the document embedding may be formed using any other technique mentioned above.

In an embodiment, the security controller (168) is configured to receive a request from a user to access the document in the electronic form and determine attribute (s) associated with the user requesting access to the document. The attribute indicates a user security risk profile. Examples of the attributes associated with the user includes but not limited to a group/department the user belongs to (e.g.: engineering, finance, HR etc.), user's document access history, list of documents user has access to and any other information of user's activity. Further, the security controller (168) is configured to determine a document security risk profile based on the semantic representation of the document and semantic representation of neighboring documents and ascertain the risk profile associated with the document by determining whether the user security risk profile matches the document security risk profile. The security controller (168) allows the user to access the document, in response to determining that the user security risk profile matches with the document security risk profile. However, the security controller (168) denies the user the access to the document, in response to determining that the user security risk profile does not match with the document security risk profile. For example, if a document's semantic neighbors are all not accessible by a particular user, then the security controller (168) will deny the user access to the document as well. If some or all of the document's neighbors are accessible by a particular user, we first determine a weight associated with each of the neighboring document that's based on the neighbor document's similarity. The weight could be the similarity itself or the similarity value transformed by a decay function such as an exponential or a reverse sigmoid. For example, we pass the similarity value through a reverse sigmoid function to obtain the weight using the equation weight=exp(5−(100−(similarity)*100)/((100−0.95*100)/5)).

If the sum of weights for all the neighbors exceeds a predefined threshold (we use 0.8 as the threshold) for a particular user, the user is then granted access to the document.

The security controller (168) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Therefore, the proposed method ensures that an unauthorized user may not be able to access the documents related to another department to which the user may not belong. Thus, the proposed method provides security to the data within the organization and curbs data leakages within the different departments of the organization.

At least one of the plurality of modules/components of the document semantics controller (160) may be implemented through an artificial intelligence (AI) model. A function associated with AI may be performed through memory (120) and the processor (140).

The one or a plurality of processors controls the processing of the input data in accordance with a predefined operating rule or AI model stored in the non-volatile memory and the volatile memory. The predefined operating rule or artificial intelligence model is provided through training or learning. Being provided through learning means that, by applying a learning process to a plurality of learning data, a predefined operating rule or AI model of a desired characteristic is made. The learning may be performed in a device itself in which AI according to an embodiment is performed, and/or may be implemented through a separate system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), transformers, attention networks and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display (170) is configured to display the document which is received with the plurality of contents. Further, the display (180) is also configured to display a message indicating that the user is allowed to access the document when the user security risk profile matches the document security risk profile. The display (180) is also configured to display a message indicating that the user is denied access to the document when the user security risk profile does not match the document security risk profile.

Although the FIG. 1 shows the hardware elements of the electronic device (100) but it is to be understood that other embodiments are not limited thereon. In other embodiments, the electronic device (100) may include less or more number of elements. Further, the labels or names of the elements are used only for illustrative purpose and does not limit the scope of the invention. One or more components can be combined together to perform same or substantially similar function.

Figure 2:
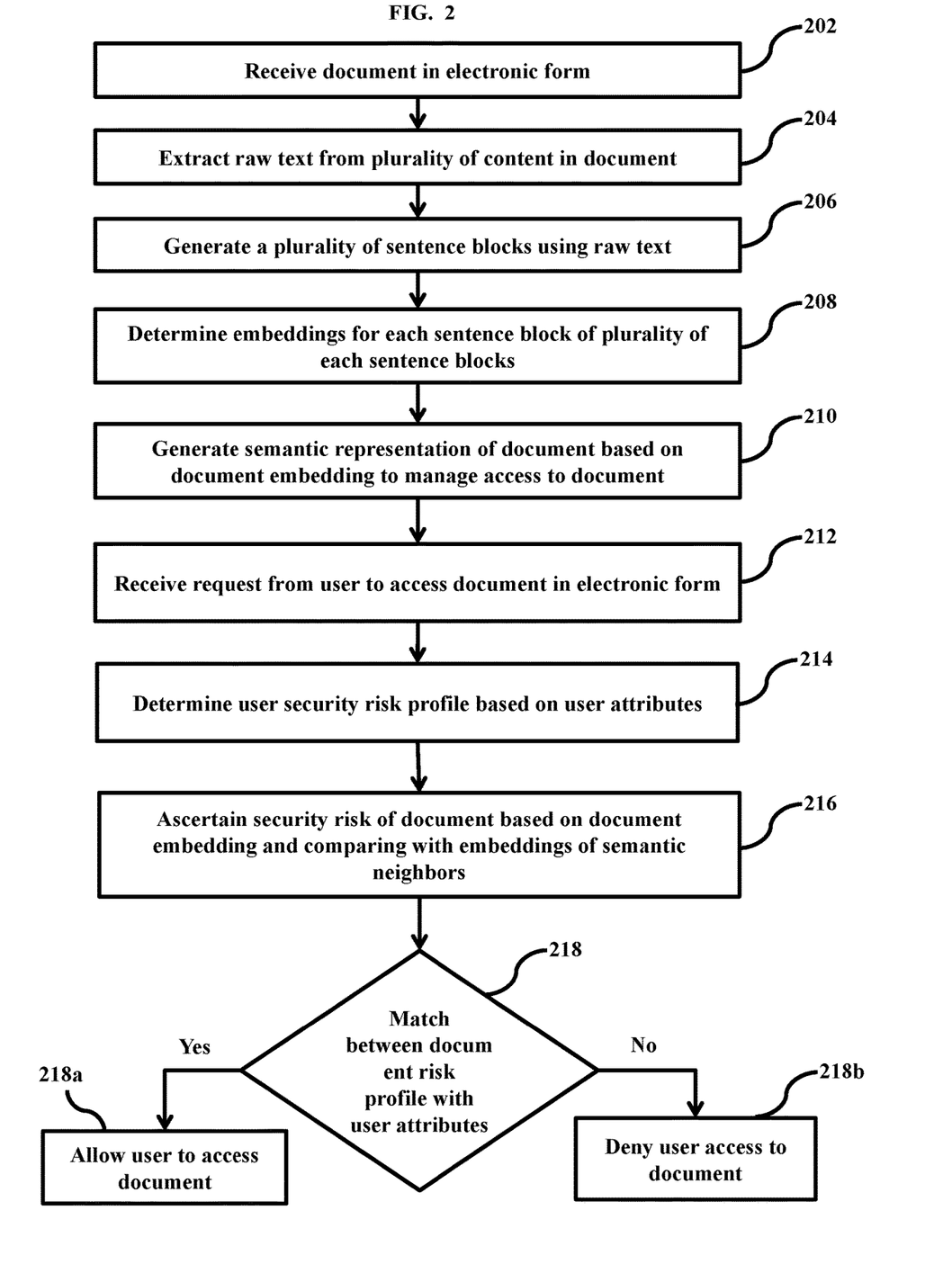
FIG. 2 is a flow chart for a method for generating semantic representation of the document to determine the data security risk associated with the document, according to the embodiments as disclosed herein.

FIG. 2 is a flow chart 200 for a method for generating semantic representation of the document to determine the data security risk associated with the document, according to the embodiments as disclosed herein.

Referring to the FIG. 2, at step 202, the electronic device (100) receives the document in the electronic form. For example, as illustrated in the FIG. 1, the document semantics controller (160) of the electronic device (100) is configured to receive the document in the electronic form.

At step 204, the electronic device (100) extracts the raw text from the plurality of content in the document. For example, as illustrated in the FIG. 1, the document semantics controller (160) of the electronic device (100) is configured to extract the raw text from the plurality of content in the document.

At step 206, the electronic device (100) generates the plurality of sentence blocks using the raw text. For example, as illustrated in the FIG. 1, the document semantics controller (160) of the electronic device (100) is configured to generate the plurality of sentence blocks using the raw text.

At step 208, the electronic device (100) determines the embeddings for each sentence block of the plurality of each sentence blocks. For example, as illustrated in the FIG. 1, the document semantics controller (160) of the electronic device (100) is configured to determine the embeddings for each sentence block of the plurality of each sentence blocks.

At step 210, the electronic device (100) generates the semantic representation of the document based on the document embedding to determine the data security risk associated with the document. For example, as illustrated in the FIG. 1, the document semantics controller (160) of the electronic device (100) is configured to generate the semantic representation of the document based on the document embedding to manage access to the document.

At step 212, the electronic device (100) receives the request from the user to access the document in the electronic form. For example, as illustrated in the FIG. 1, the document semantics controller (160) of the electronic device (100) is configured to receive the request from the user to access the document in the electronic form.

At step 214, the electronic device (100) determines the user security risk profile based on the user attributes. For example, as illustrated in the FIG. 1, the document semantics controller (160) of the electronic device (100) is configured to determine the class of the user requesting to access the document based on the user identity parameter.

At step 216, the electronic device (100) ascertains the document security risk profile based on the document embedding and comparing with the embeddings of semantic neighbors. For example, as illustrated in the FIG. 1, the document semantics controller (160) of the electronic device (100) is configured to ascertain the document security risk profile based on the document embedding and comparing with the embeddings of semantic neighbors.

At step 218, the electronic device (100) determines whether the user security risk profile matches the document security risk profile. At step 218*a*, in response to determining that the user security risk profile matches the document security risk profile, the electronic device (100) allows the user to access the document. At step 218*b*, in response to determining that the user security risk profile does not match the document security risk profile, the electronic device (100) denies the user the access to the document. For example, as illustrated in the FIG. 1, the document semantics controller (160) of the electronic device (100) is configured to determine whether the user security risk profile matches the document security risk profile.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3A:
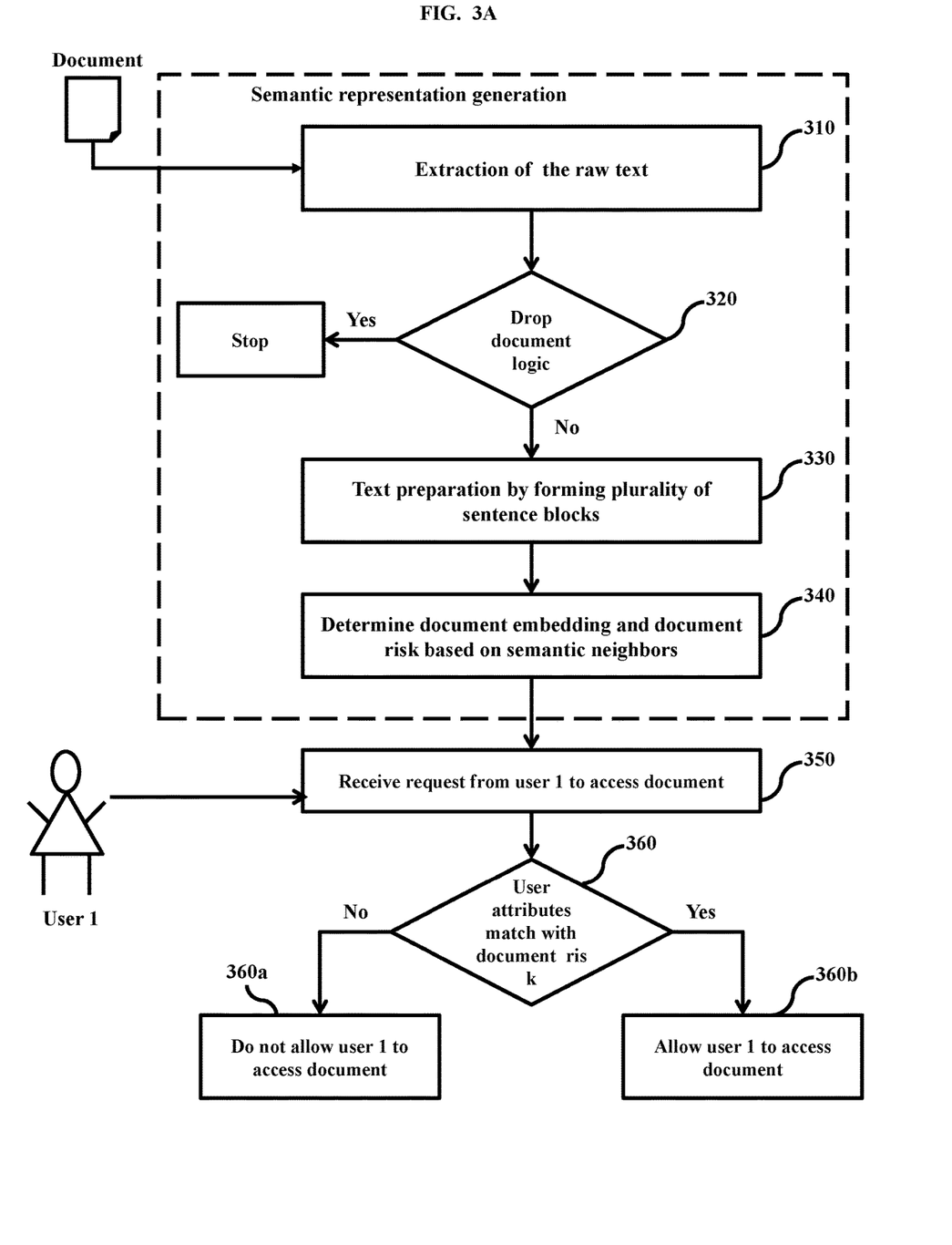
FIG. 3A illustrates an overall sequence of steps for generating the semantic representation of the document to determine the data security risk associated with the document, according to the embodiments as disclosed herein.

FIG. 3A illustrates an overall sequence of steps for generating the semantic representation of the document to determine the data security risk associated with the document, according to the embodiments as disclosed herein.

Referring to the FIG. 3A, the overall sequence of steps involved in generating the semantic representation of the document to manage access to the document is provided.

At step 310, the text extraction controller (162) of the electronic device (100) receives the document in the electronic form and extracts the raw text from the plurality of content in the document for processing. The document is subjected to various types of filtering such as for example character filtering, filtering of redundant words and sentences, etc. before the raw text is processed.

At step 320, the sentence controller (164) determines whether the document is to be processed further based on a predefined threshold for the raw text. In case the extracted raw text is too small to have a meaningful representation then the sentence controller (164) drops the document from further processing. The sentence controller (164) evaluates the number of words and characters, and if either of the number of words and characters is greater than the predefined thresholds then the sentence controller (164) processes the document further.

At step 330, the sentence controller (164) prepares the text by generating the plurality of sentence blocks using the extracted raw text. Each sentence block has a predefined size such as say 128.

At step 340, the electronic device (100) determines the embeddings for each sentence block of the plurality of sentence blocks and generates the semantic representation of the document based on the document embedding to manage access to the document. The document embedding is obtained using the embeddings for each sentence block of the plurality of sentence blocks. At step 350, the electronic device (100) receives the request from a user 1 to access the document. At step 360, the electronic device (100) determines whether the attributes of user 1 matches the security risk profile of the document. In response to determining that the attributes of the user 1 does not match the document risk, the electronic device (100) does not allow the user 1 to access the document (as shown in step 360*a*) and in response to determining that the attributes of user 1 matches the security risk profile of document, the electronic device (100) allows user 1 to access the document.

Figure 3B:
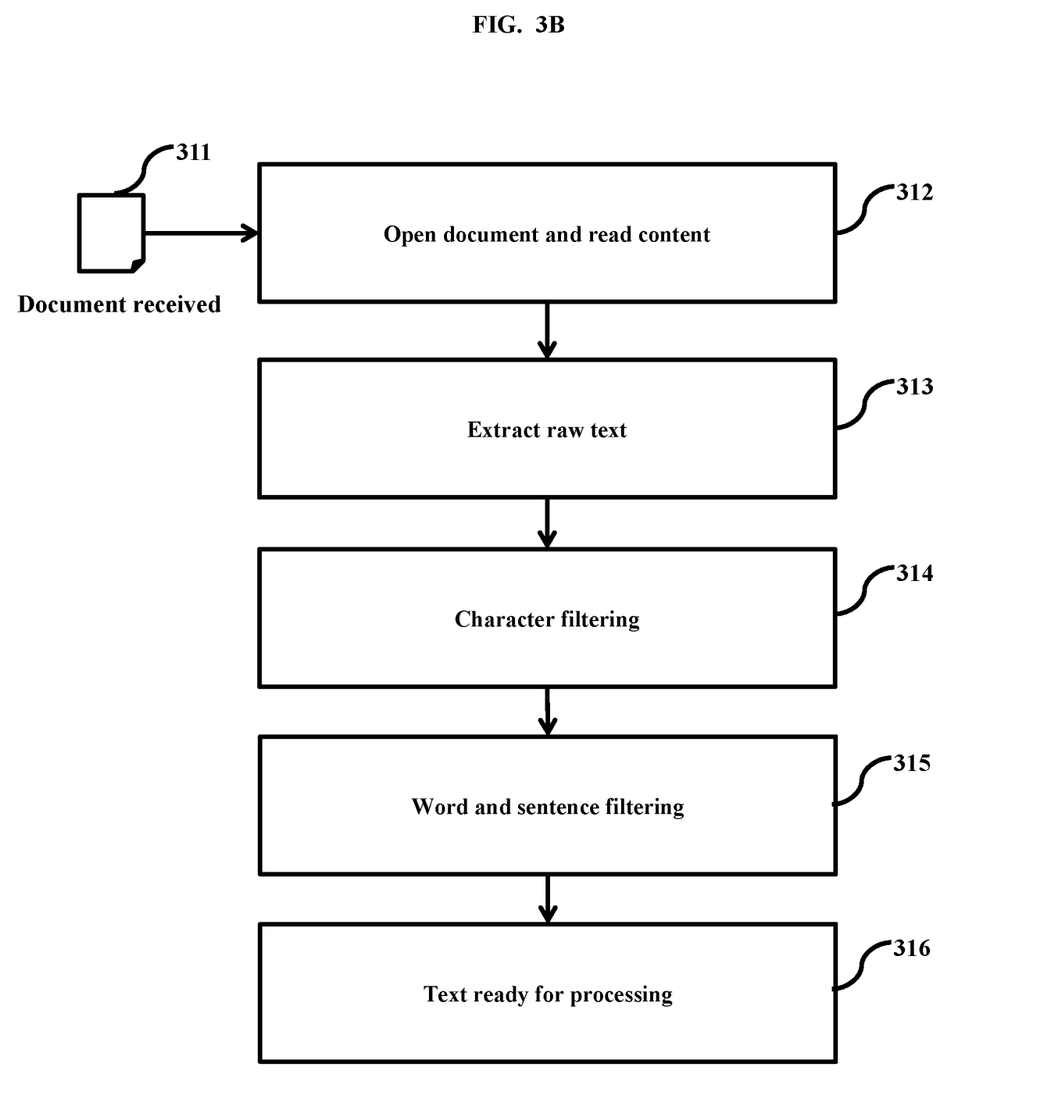
FIG. 3B illustrates a method for extracting raw text from a plurality of content in the document by a document semantics controller of the electronic device, according to the embodiments as disclosed herein.

FIG. 3B illustrates a method for processing the raw text extracted from the plurality of content in the document by the document semantics controller (160) of the electronic device (100), according to the embodiments as disclosed herein.

Referring to the FIG. 3B, the method for extracting raw text from a plurality of content in the document is performed by the text extraction controller (162) of the electronic device (100). At step 311, the text extraction controller (162) receives the document. At step 312, the text extraction controller (162) opens the document in the native format and reads the plurality of content in the document. At step 313, the text extraction controller (162) extracts the raw text from the plurality of content in the document. Further, at step 314, the text extraction controller (162) performs a character filtering of the plurality of content. The character filtering is performed to eliminate predefined types of characters from the plurality of content in the document. The predefined types of characters include but not limited to all non-ASCII characters in the extracted raw text. Also, depending on the document and the plurality of contents of in the document, the punctuations and numeric characters can also be removed by character filtering.

At step 315, the text extraction controller (162) determines known words, phrases and sentences in the document which may not correspond to the semantic representation of the document and filters to eliminate the determined known words and sentences in the document from the extracted raw text. The known word, sentence, phrase includes for example standard template verbiage that may affect in determining the semantics of the document, phrases meant as headers or footers that were mistakenly included as part of the raw text. The filtering can be performed by using rules and regular expressions.

At step 316, the text extraction controller (162) provides the raw text extracted from the plurality of content in the document after the character filtering and the filtering to eliminate the at least one standard template verbiage for processing further.

Figure 3C:
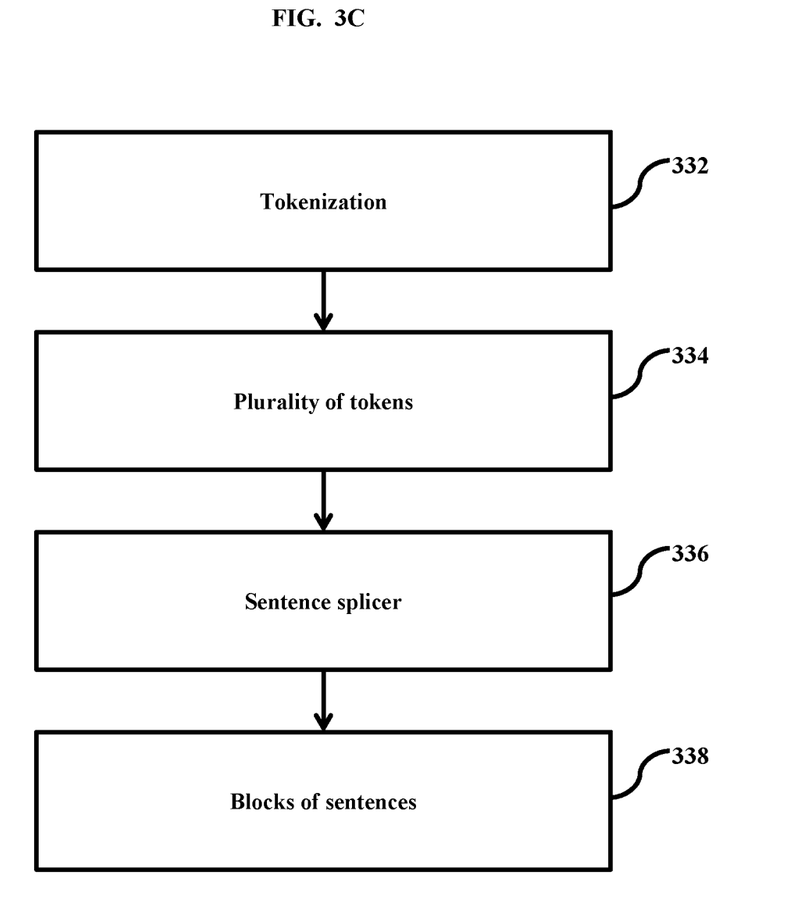
FIG. 3C illustrates a method for generating a plurality of sentence blocks using the raw text by the document semantics controller of the electronic device (100), according to the embodiments as disclosed herein.

FIG. 3C illustrates a method for generating a plurality of sentence blocks using the raw text by the document semantics controller (160) of the electronic device (100), according to the embodiments as disclosed herein.

Referring to the FIG. 3C, at step 332, the sentence controller (164) generates a plurality of tokens using the raw text extracted from the document and at step 334, the plurality of tokens are available at the electronic device (100). The tokenization of the raw text is performed using any existing tokenization algorithm such as for example but not limited to: word piece tokenization, wordtokenize tool from Python NLTK library, etc.

Further, at step 336, the sentence controller (164) generates the plurality of sentence blocks based on a sentence splicing of the plurality of tokens. The plurality of sentence blocks may be generated using standard Natural language processing (NLP) algorithms such as the ones implemented in NLTK to generate sentence blocks using the raw text. Each sentence block of the plurality of sentence blocks comprises a predefined number of tokens. For example, each sentence block is no longer than 128 tokens in length.

If the number of tokens in a sentence block is larger than 128, the sentence controller (164) breaks the tokens into sentence blocks where each sentence block is of length 128. The last sentence block may not have 128 tokens. In that case, the sentence controller (164) considers the token, and append it to the last sentence block if the combined token-length of the last sentence block and the next token is less than or equal to 128.

Figure 3D:
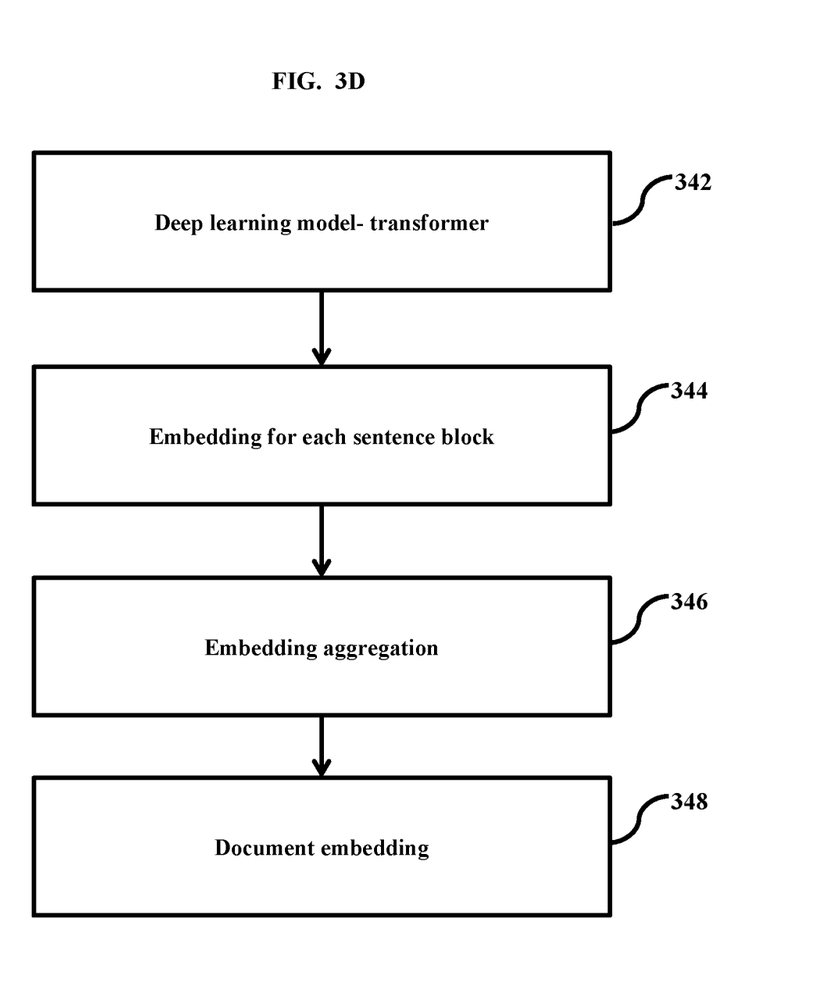
FIG. 3D illustrates a method for generating a document embedding used to determine the semantic representation of the document by the document semantics controller of the electronic device, according to the embodiments as disclosed herein.

FIG. 3D illustrates a method for generating a document embedding used to determine the semantic representation of the document by the document semantics controller (160) of the electronic device (100), according to the embodiments as disclosed herein.

Referring to the FIG. 3D, the embedding controller (166) of the document semantics controller (160) processes the plurality of sentence blocks to determine the embeddings for each of the plurality of sentence blocks. The embeddings for each of the plurality of sentence blocks are in the form of vectors and are extracted using a deep-learning language model (step 342). Further, the proposed method leverages state-of-the-art model architectures called attention networks (i.e., Transformers) and bidirectional transformers. For example, the models include but are not limited to: Google Universal Sentence Encoder Large v3, Google BERT and S-BERT and all the other variants of BERT.

At step 344, the electronic device (100) extracts the embeddings for each of the sentence blocks of the plurality of sentence blocks and at step 346, the electronic device (100) determines the aggregate of the embeddings of the plurality of sentence blocks to arrive at the document embedding which is then used to determine the semantic representation of the document and also to manage access to the document based on the document embedding (step 348).

In an embodiment, the semantic representation of the document based on the document embedding is generated by aggregating the embeddings of the plurality of sentence blocks as below: Consider $x_1, x_2, x_3, x_4, \ldots, x_N$ are N embedding vectors for N sentence blocks, also referred together by the matrix X. Let A be the vector of token-lengths of the sentence blocks. The document embedding is then determined using:

$$\text{Document embedding} = \frac{\sqrt{A} \odot X}{\sqrt{\text{sum}(A)}} \quad (1)$$

The document embedding is then normalized to have unit L2 norm.

In another embodiment, the semantic representation of the document based on the document embedding is generated using the outlying sentences exclusion technique. In the outlying sentences exclusion technique, the electronic device (100) determines a matrix comprising the embeddings of the plurality of sentence blocks and performs a Robust Principal Components Analysis (PCA) on the said matrix. The magnitude of an Error matrix provides an outliner score to the embeddings of each of the sentence blocks which indicates the level of "outlying" of each of the sentence blocks. Further, the electronic device (100) filters by excluding the most anomalous 20% of the sentence embeddings and aggregates the embeddings of the remaining sentence blocks to obtain the document embedding which is used to generate the semantic representation of the document.

In yet another embodiment, the semantic representation of the document based on the document embedding is generated using the semantic noise filtering technique. In the semantic noise filtering technique, the electronic device (100) takes the embeddings of the plurality of sentence blocks across tenants and clusters the embeddings. Further, the electronic device (100) allows the user to manually review the clusters to identify "semantic noise", where the semantic noise is sentence blocks which may not meaningfully contribute to the overall semantics of the document.

Once the user identifies the semantic noises, the sentence blocks which belong to the clusters identified as semantic noises are filtered and embeddings associated with the remaining sentence blocks are aggregated to determine the document embedding which is used to generate the semantic representation of the document.

In another embodiment, the semantic representation of the document based on the document embedding is generated using representative sentences. In the representative sentences technique, the electronic device (100) generates a similarity graph. Each node in the similarity graph is a sentence block and edge-weights in the similarity graph are provided by angular cosine similarities. Further, the electronic device (100) determines a page-rank score for each of the sentence block of the plurality of sentence blocks using a page-rank algorithm. The page-rank score is determined as: Let G=(V, E) be a directed graph with the set of embeddings V and set of edges E, where E is a subset of V×V. For a given embedding $V_i$, let $In(V_i)$ be the set of embeddings that point to the predecessor embeddings, and $Out(V_i)$ be the set of embeddings that the embedding $V_i$ points to the next embeddings. The page score of the embedding $V_i$ is therefore defined as $$S(V_i) = (1-d) + d * \sum_{j \in In(V_i)} \frac{1}{|Out(V_j)|} S(V_j) \quad (2)$$

Where d is a damping factor that can be set between 0 and 1 (the proposed method sets the value of the damping factor at 0.85), which has the role of integrating into the model the probability of jumping from a given embedding associated with a sentence block to another random embedding associated with another sentence block in the similarity graph.

Further, the edge-weights are determined using the angular cosine similarity computed on the embeddings of the sentence blocks. For the embeddings u and v, angular cosine similarity can be computed as:

$$sim(u, v) = \left(1 - \arccos\left(\frac{u \cdot v}{\|u\|\|v\|}\right) \middle/ \pi\right) \quad (3)$$

The page-rank score associated with a sentence block indicates a priority of the sentence block. Further, the representative sentences technique includes, the electronic device (100) computing a maximum margin relevance scoring with a factor between 0.85 to 1. The maximum margin relevance scoring is performed to augment the page-rank score associated with the plurality of sentence blocks so that the sentence blocks with the highest page-rank score are not overrun with identical sentence blocks and to ensure that a diverse set of sentence blocks are captured in the top 20%. The Maximum marginal relevance (MMR) metric is defined as:

Let C be the document collection/document stream, Q be an ad-hoc query or analyst-profile or topic/category specification.

Let R=IR(C, Q, q) i.e., the ranked list of documents retrieved by an IR system, given C and Q and a relevance threshold theta, below which the electronic device (100) will not retrieve the documents, q may be a degree of match or number of documents.

Let S be a subset of documents in R already provided to the user. Therefore, R/S is the set difference i.e., the set of documents in R, not yet offered to the user.

$$MMR(C,Q,R,S)=\text{Argmax}[\lambda *Sim_1(D_i,Q)\text{Max}(Sim_2(D_i,D_j))] \quad (4)$$

Where $D_i \in R\backslash S$ and $D_j \in S$
where sim1 and sim2 (similarities between documents) are defined by the angular cosine similarity between their embeddings. The proposed method uses a value between 0.85 and 1 for $\lambda$.

As, the maximum margin relevance scoring for the plurality of sentence blocks is determined, the electronic device (100) then selects a predetermined percentage of sentence blocks of the plurality of sentence blocks with the highest maximum margin relevance scoring for further processing. Further, the embedding of the predetermined percentage of sentence blocks is aggregated to determine the document embedding, which is used to generate the semantic representation of the document. For example, consider that the predetermined percentage is 20%, then the electronic device (100) selects the top 20% sentence blocks of the plurality of sentence blocks having the highest scores (or a minimum of 20 sentences, whichever is higher) and aggregate the embedding associated with the top 20% sentence blocks having the highest scores to obtain the final document embedding.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for determining user access to an electronic document based on semantic representation of the document using an electronic device (100), the method comprising:
    generating, by a document semantics controller (160) of the electronic device (100), a semantic representation of the document to determine the data security risk associated with the document;
    receiving, by the document semantics controller (160) of the electronic device (100), at least one request from at least one user to access the document in the electronic form;
    determining, by the document semantics controller (160) of the electronic device (100), at least one attribute of a plurality of attributes associated with the user, wherein the at least one attribute indicates a user security risk profile;
    determining, by the document semantics controller (160) of the electronic device (100), a document security risk profile based on the semantic representation of the document and semantic representation of neighboring documents;
    determining, by the document semantics controller (160) of the electronic device (100), whether the user security risk profile matches the document security risk profile; and
    performing, by the document semantics controller (160) of the electronic device (100), one of:
        allow the user to access the document, in response to determining that the user security risk profile matches the document security risk profile, and
        deny the user access to the document, in response to determining that the user security risk profile does not match the document security risk profile.

2. The method as claimed in claim 1, where generating, by the document semantics controller (160) of the electronic device (100), the semantic representation of the document comprises:
    receiving, by the document semantics controller (160) of the electronic device (100), a document in an electronic form, wherein the document comprises a plurality of content;
    determining, by the document semantics controller (160) of the electronic device (100), raw text from the plurality of content;
    generating, by the document semantics controller (160) of the electronic device (100), a plurality of sentence blocks of a predefined size using the raw text;
    determining, by the document semantics controller (160) of the electronic device (100), at least one embeddings for each of the plurality of sentence blocks;
    determining, by the document semantics controller (160) of the electronic device (100), the semantic representation of the document based on the at least one embeddings for each of the plurality of sentence blocks; and
    generating, by the document semantics controller (160) of the electronic device (100), the semantic representation of the document to determine the data security risk associated with the document.

3. The method as claimed in claim 2, wherein determining, by the document semantics controller (160) of the electronic device (100), the raw text from the plurality of content comprises:
    extracting, by the document semantics controller (160) of the electronic device (100), the raw text from the plurality of content;
    performing, by the document semantics controller (160) of the electronic device (100), a character filtration on the raw text to eliminate predefined types of characters from the raw text;
    determining, by the document semantics controller (160) of the electronic device (100), at least one word and at least one sentence in the raw text extracted from the document which is not corresponding to the semantic representation of the document;
    eliminating, by the document semantics controller (160) of the electronic device (100), the at least one word and the at least one sentence not corresponding to the semantic representation of the document; and
    determining, by the document semantics controller (160) of the electronic device (100), the raw text from the plurality of content.

4. The method as claimed in claim 2, wherein generating, by the document semantics controller (160) of the electronic device (100), the plurality of sentences blocks using the raw text comprises:
    determining, by the document semantics controller (160) of the electronic device (100), that a number of extracted raw text meets a predefined threshold for the raw text;
    generating, by the document semantics controller (160) of the electronic device (100), a plurality of tokens by combining a set of the raw text extracted from the document; and generating, by the document semantics controller (160) of the electronic device (100), the plurality of sentence blocks based on sentence splicing of the plurality of tokens, wherein each sentence block of the plurality of sentence blocks comprises a predefined number of tokens.

5. The method as claimed in claim 2, wherein the at least one embeddings for each of the plurality of sentence blocks is determined using a deep-learning language model.

6. The method as claimed in claim 2, wherein determining, by the document semantics controller (160) of the electronic device (100), the semantic representation of the document based on the at least one embeddings for each of the plurality of sentence blocks comprises:
   determining, by the document semantics controller (160) of the electronic device (100), an embedding matrix comprising the at least one embeddings for each of the plurality of sentence blocks;
   determining, by the document semantics controller (160) of the electronic device (100), a document embedding by aggregating the at least one embeddings for each of the plurality of sentence blocks in the embedding matrix; and
   determining, by the document semantics controller (160) of the electronic device (100), the semantic representation of the document based on the document embedding.

7. The method as claimed in claim 2, wherein determining, by the document semantics controller (160) of the electronic device (100), the semantic representation of the document based on the at least one embeddings for each of the plurality of sentence blocks comprises:
   generating, by the document semantics controller (160) of the electronic device (100), a similarity graph using the plurality of sentence blocks;
   determining, by the document semantics controller (160) of the electronic device (100), a page-rank score for the each of the sentence blocks of the plurality of sentence blocks;
   performing, by the document semantics controller (160) of the electronic device (100), a maximum margin relevance scoring on the page-rank score determined for each of the sentence blocks;
   determining, by the document semantics controller (160) of the electronic device (100), a set of sentence blocks with highest maximum margin relevance scoring;
   determining, by the document semantics controller (160) of the electronic device (100), a document embedding by aggregating the set of sentence blocks with the highest maximum margin relevance scoring; and
   determining, by the document semantics controller (160) of the electronic device (100), the semantic representation of the document based on the document embedding.

8. The method as claimed in claim 2, wherein determining, by the document semantics controller (160) of the electronic device (100), the semantic representation of the document based on the at least one embeddings for each of the plurality of sentence blocks comprises:
   identifying, by the document semantics controller (160) of the electronic device (100), embeddings of a set of sentence blocks of the plurality of sentence blocks that are outlying;
   filtering, by the document semantics controller (160) of the electronic device (100), to exclude the set of sentence blocks that are outlying;
   determining, by the document semantics controller (160) of the electronic device (100), a document embedding by aggregating the embeddings of remaining sentence blocks after filtering the set of sentence blocks that are outlying; and
   determining, by the document semantics controller (160) of the electronic device (100), the semantic representation of the document based on the document embedding.

9. The method as claimed in claim 2, wherein determining, by the document semantics controller (160) of the electronic device (100), the semantic representation of the document based on the at least one embeddings for each of the plurality of sentence blocks comprises:
   determining, by the document semantics controller (160) of the electronic device (100), a plurality of clusters comprising each of the embeddings of each of the plurality of sentence blocks;
   determining, by the document semantics controller (160) of the electronic device (100), at least one cluster of the plurality of clusters that is a semantic noise;
   filtering, by the document semantics controller (160) of the electronic device (100), the at least one cluster of the plurality of clusters that is the semantic noise;
   determining, by the document semantics controller (160) of the electronic device (100), a document embedding by aggregating the embeddings of remaining sentence blocks after filtering the semantic noise; and
   determining, by the document semantics controller (160) of the electronic device (100), the semantic representation of the document based on the document embedding.

10. An electronic device (100) for determining user access to an electronic document based on semantic representation of the document, the electronic device (100) comprising:
    a memory (120);
    a processor (140) coupled to the memory (120);
    a document semantics controller (160) coupled to the memory (120) and the processor (140), and configured to:
      generate a semantic representation of the document to determine the data security risk associated with the document;
      receive at least one request from at least one user to access the document in the electronic form;
      determine at least one attribute of a plurality of attributes associated with the user, wherein the at least one attribute indicates a user security risk profile;
      determine a document security risk profile based on the semantic representation of the document and semantic representation of neighboring documents;
      determine whether the user security risk profile matches the document security risk profile; and
      perform one of:
        allow the user to access the document, in response to determining that the user security risk profile matches the document security risk profile, and
        deny the user access to the document, in response to determining that the user security risk profile does not match the document security risk profile.

11. The electronic device (100) as claimed in claim 10, wherein the document semantics controller (160) is further configured to:
    receive a document in an electronic form, wherein the document comprises a plurality of content;
    determine raw text from the plurality of content;

generate a plurality of sentence blocks of a predefined size using the raw text;
determine at least one embeddings for each of the plurality of sentence blocks;
determine the semantic representation of the document based on the at least one embeddings for each of the plurality of sentence blocks; and
generate the semantic representation of the document to determine the data security risk associated with the document.

12. The electronic device (100) as claimed in claim 10, wherein the document semantics controller (160) is configured to determine the raw text from the plurality of content by:
extract the raw text from the plurality of content;
perform a character filtration on the raw text to eliminate predefined types of characters from the raw text;
determine at least one word and at least one sentence in the raw text extracted from the document which is not corresponding to the semantic representation of the document;
eliminate the at least one word and the at least one sentence not corresponding to the semantic representation of the document; and
determine the raw text from the plurality of content.

13. The electronic device (100) as claimed in claim 10, wherein the document semantics controller (160) is configured to generate the plurality of sentences blocks using the raw text by:
determine that a number of extracted raw text meets a predefined threshold for the raw text;
generate a plurality of tokens by combining a set of the raw text extracted from the document; and
generate the plurality of sentence blocks based on sentence splicing of the plurality of tokens, wherein each sentence block of the plurality of sentence blocks comprises a predefined number of tokens.

14. The electronic device (100) as claimed in claim 10, wherein the at least one embeddings for each of the plurality of sentence blocks is determined using a deep-learning language model.

15. The electronic device (100) as claimed in claim 10, wherein the document semantics controller (160) is configured to determine the semantic representation of the document based on the at least one embeddings for each of the plurality of sentence blocks by:
determine an embedding matrix comprising the at least one embeddings for each of the plurality of sentence blocks;
determine a document embedding by aggregating the at least one embeddings for each of the plurality of sentence blocks in the embedding matrix; and
determine the semantic representation of the document based on the document embedding.

16. The electronic device (100) as claimed in claim 10, wherein the document semantics controller (160) is configured to determine the semantic representation of the document based on the at least one embeddings for each of the plurality of sentence blocks by:
generate a similarity graph using the plurality of sentence blocks;
determine a page-rank score for the each of the sentence blocks of the plurality of sentence blocks;
perform a maximum margin relevance scoring on the page-rank score determined for each of the sentence blocks;
determine a set of sentence blocks with highest maximum margin relevance scoring;
determine a document embedding by aggregating the set of sentence blocks with the highest maximum margin relevance scoring; and
determine the semantic representation of the document based on the document embedding.

17. The electronic device (100) as claimed in claim 10, wherein the document semantics controller (160) is configured to determine the semantic representation of the document based on the at least one embeddings for each of the plurality of sentence blocks by:
identify embeddings of a set of sentence blocks of the plurality of sentence blocks that are outlying;
filter to exclude the set of sentence blocks that are outlying;
determine a document embedding by aggregating the embeddings of remaining sentence blocks after filtering the set of sentence blocks that are outlying; and
determine the semantic representation of the document based on the document embedding.

18. The electronic device (100) as claimed in claim 10, wherein the document semantics controller (160) is configured to determine the semantic representation of the document based on the at least one embeddings for each of the plurality of sentence blocks by:
determine a plurality of clusters comprising each of the embeddings of each of the plurality of sentence blocks;
determine at least one cluster of the plurality of clusters that is a semantic noise;
filter the at least one cluster of the plurality of clusters that is the semantic noise;
determine a document embedding by aggregating the embeddings of remaining sentence blocks after filtering the semantic noise; and
determine the semantic representation of the document based on the document embedding.

* * * * *